(12) United States Patent
Porter

(10) Patent No.: US 6,282,270 B1
(45) Date of Patent: *Aug. 28, 2001

(54) WORLD WIDE WEB VOICE MAIL SYSTEM

(75) Inventor: Lawrence Leon Porter, Lyndhurst (GB)

(73) Assignee: International Business Machines Corp., Armonk, NY (US)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/952,636
(22) PCT Filed: Aug. 24, 1995
(86) PCT No.: PCT/GB95/02009
§ 371 Date: Nov. 21, 1997
§ 102(e) Date: Nov. 21, 1997
(87) PCT Pub. No.: WO96/37989
PCT Pub. Date: Nov. 28, 1996

(30) Foreign Application Priority Data

May 26, 1995 (GB) .................................................. 9510779

(51) Int. Cl.[7] ...................................................... H04M 1/64
(52) U.S. Cl. ...................... 379/88.17; 370/352; 709/203; 709/228
(58) Field of Search .............................. 379/67.1, 88.13, 379/88.17, 88.22, 88.23, 88.25, 88.27, 900; 709/203, 206, 209, 200–202, 228; 370/351–356, 428, 429; 707/8, 104

(56) References Cited

U.S. PATENT DOCUMENTS

| | | | |
|---|---|---|---|
| 5,297,249 | * 3/1994 | Bernstein et al. | 345/356 |
| 5,333,266 | * 7/1994 | Boaz et al. | 709/206 |
| 5,406,557 | * 4/1995 | Baudoin | 370/407 |
| 5,452,289 | * 9/1995 | Sharma et al. | 370/286 |
| 5,479,411 | * 12/1995 | Klein | 379/88.13 |
| 5,544,320 | 8/1996 | Konrad | 709/203 |

(List continued on next page.)

OTHER PUBLICATIONS

Int'l Application Published Under The Patent Cooperation Treaty (PCT) Int'l No. WO 96/20553, "Unified Messaging and Long Distance Communication System", Inventor: Alastair T. Gordon, Toronto, CA., Pub. Date: Jul. 4, 1996.

(List continued on next page.)

*Primary Examiner*—Fan Tsang
*Assistant Examiner*—Roland G. Foster
(74) *Attorney, Agent, or Firm*—Jerry W. Herndon

(57) ABSTRACT

Using the Internet World Wide Web (WWW) network 320, a WWW Client 310 can communicate with a WWW Server 330 to request access to a user's voice mail. In order to satisfy this request, the user enters their voice mail mailbox number, and activates an appropriate hyperlink. The WWW Server then launches an application, MSG Client 350, which in turn communicates with an application, MSG Server 370, that runs in conjunction with the voice mail system 380, 385, 390. In response to an initial message from the MSG Client, the MSG Server returns information about all voice mail messages within the specified mailbox, which are displayed at the WWW Client. This display includes a hyperlink to each message in the mailbox. Thus a user can select a message from within the mailbox by activating this hyperlink, which prompts the WWW Server to again launch MSG Client. This in turn sends a second message to MSG Server, which responds by returning the actual audio data for the selected message to the MSG Client, which is forwarded onto the WWW Client via the WWW Server. The WWW Client then plays out the audio data, allowing the user to hear his or her selected voice mail message.

8 Claims, 3 Drawing Sheets

U.S. PATENT DOCUMENTS

| | | | | |
|---|---|---|---|---|
| 5,557,659 | * | 9/1996 | Hyde-Thomson | 379/88.13 |
| 5,608,786 | * | 3/1997 | Gordon | 370/352 |
| 5,675,507 | * | 10/1997 | Bobo, II | 709/206 |
| 5,784,565 | * | 7/1998 | Lewine | 709/229 |
| 5,884,032 | | 5/1999 | Bateman et al. | 709/204 |
| 5,963,618 | * | 10/1999 | Porter | 379/88.17 |
| 6,052,367 | * | 4/2000 | Bowater et al. | 370/352 |
| 6,181,781 | * | 1/2001 | Porter et al. | 379/88.17 |

OTHER PUBLICATIONS

Computer Reseller News, Nov. 28, 1994 US, p. 12, By: Charlotte Dunlap, "AT&T: Internet Can Talk, Too".

Connexions (US) vol. 8, No. 11, Nov. 1994, pp. 25–27, "Networked Voice Messaging", By: Greg Vaudreuil.

Thuraisingham, Bhavani, Handbook of Data Management, Jan. 1, 1998, Auerbach Publications, CRC Press LLC, ISBN 084939953x, Chapter 31.*

Slone, John, Handbook of Local Area Networks, 1998 Ed., Jan. 1, 1998, Auerbach Publications, CRC Press LLC, ISBN 0849399483, Section 6-3-2.*

McCrorey, Jack, 3 Tier Client/Server Architecture [online], Jun. 2000 [retrieved on Jun. 27, 2000]. Retrieved from the Internet: <URL:http://www.wpi.edu/~johnmc/pr3tier.html>.*

Martin, R., Two Tiers or three?, Journal of Systems Management, vol. 45, Issue 8, p. 32 [online], Aug. 1994 [retrieved Dec. 3, 1999]. Retrieved from Internet: <URL:http://proquest.umi.com.

Enhanced Systems Introduces Software to Access and Manage Unified Messages Over the Internet, Oct. 30, 1995, Enhanced System, Inc., The Gale Group PR Newswire Association, Inc. [online]. [Retrvd Dec. 2, 1999] Retrvd from: Dialog Info. Services Acc. No. 01315610.

Vodavi Technology Annouces New Unified Messaging Software Utilizing the Internet, Vodavi Inc., Nov. 13, 1995, PR Newswire Accoc, Inc. [online]. Retrvd Dec. 2, 1999 from: Dialog Info. Svc. Acc. No. 08326506.

Boston Technology Goes Online, Boston Technology Inc., Dec. 13, 1995, The Gale Group PR Newswire Association, Inc. [online]. [Rtrvd Dec. 2, 1999] Rtvd from: Dialog Information Services Accession No. 02950427.

Harry Newton, Newton's Telecom Dictionary, 8th Ed., 11/94, ISBN 0–936648–60–0, Flatiron Publishing, p. 232.*

Harry Newton, Newton's Telecom Dictionary, 8th Edition, ISBN 0–936648–60–0, Flatiron Publishing, Inc., pp. 1010–1011, Nov. 1994.*

T. Lau, Building a Hypermedia Information System on the Internet, Professional Communication Conference, 1994. IPCC'94 Proc. Scaling New Heights in Tech. Communication., Internationl, pp. 192–197 [online], [retrvd on Jul. 27, 1999] <URL:http://iel.ihs.com/>, Oct. 1994.*

* cited by examiner

WORLD WIDE WEB VOICE MAIL SYSTEM

The present invention relates to voice mail systems, and in particular to improving the way in which such voice mail systems can be accessed.

Voice mail systems (also termed voice messaging systems) attach to the telephone network, often via a PBX, and are used to store messages from incoming calls when the intended recipient is absent or otherwise engaged. The intended recipient can then listen to their stored messages at some future time. A voice mail system is generally implemented either on special purpose computer hardware, or else on a standard computer workstation equipped with a suitable telephony interface. Such voice mail systems are well-known; one example is the DirectTalkMail system, available from IBM Corporation, which operates in conjunction with the DirectTalk/6000 voice processing system (also available from IBM). Other examples of voice mail systems are described in U.S. Pat. No. 5,136,648 and EPA 0588576.

Also very well-known are computer-implemented electronic mail (e-mail) systems, such as Lotus Notes, available from Lotus Corporation, whereby computer files, primarily textual, may be sent from one computer user to another. Recently Lotus have announced a strategy whereby their e-mail will be available via the World Wide Web on the Internet.

Typically computer e-mail systems have been completely separate from voice mail systems, the former usually being accessed via a desktop computer, the latter via a telephone. However, in recent years various attempts have been made to provide a more unified mail system which can handle both textual and voice messages (such systems are sometimes referred to as multimedia systems). For example, Lotus Notes includes Phone Notes whereby voice information entered via a telephone may be captured into a Note which may then be treated in the same manner as any other Note. Essentially Phone Notes is a development environment which allows voice to be integrated into Notes applications; it does not provide a full-scale multi-user voice messaging system.

By contrast, WO87/07801 discloses an integrated system which combines a voice mail system and a computer e-mail system. In this integrated system, the user may designate one mail system (ie voice or computer) as the primary recipient for all messages. For example, if the computer is chosen as the primary recipient, then notifications of both telephone and e-mail incoming messages are provided at a desktop computer. Alternatively it is possible to chose to receive notifications of all messages via the voice mail system. In this latter case, a text to speech system may also be used to allow text (ie e-mail) messages to be accessed over the telephone. This approach is developed in U.S. Pat. No. 5,333,266, which teaches an integrated messaging system based on multiple servers for different media types. For example, voice mail is stored in an essentially conventional voice messaging system, whilst a separate server is used to store computer mail messages. The integrated messaging system maintains synchronised mail in-baskets for all media types, thereby allowing access to all mail, irrespective of media, from either a computer or a telephone.

Commercially available products which provide integrated or unified messaging include CallXpress3 DeskTop for Windows, available from Applied voice Technology Incorporated, and VMX DeskTop for Windows, available from VMX Incorporated (now part of Octel Communications Corporation). Both of these provide a graphical user interface (GUI) front end via a desktop computer into the voice mail system: for example, if a user selects a particular voice message on the screen, then the voice mail system is instructed to ring the telephone associated with that workstation and play the selected message.

Another multimedia messaging system is Intuity from AT&T. As described in Computer Reseller News, Nov. 28, 1994, p12, this is intended to allow messages to be converted from one format to another, so that users can listen to a fax message or read a voice mail message. As part of this development, AT&T will also provide access via a telephone to the World Wide Web, relying on speech recognition and text to speech software. It was further announced on Jan. 23, 1995 that Intuity would be integrated with the Lotus Notes e-mail system to allow messages to be managed either from a telephone or from a computer.

The typical desktop computer interface of such unified systems provides for much greater and more flexible information interchange between the user and the voice mail system than has hitherto been practicable. Thus the user no longer has to try to remember information and instructions played out from the voice mail system, rather this can be conveniently displayed on the computer screen. Likewise, user input commands to the voice mail system are no longer restricted to the conventional 12 touchtone (DTMF) keys on a telephone keypad, but rather can exploit the whole computer keyboard and full power of the GUI. An additional benefit of a unified mail system of course is that a user may process both voice mail and e-mail in the same session.

Nevertheless, there are problems with developing such computer interfaces for voice mail systems. Thus the big advantage of conventional voice mail systems is that a user can access them from a standard telephone anywhere in the world, because the telephone is both uniform and ubiquitous. By contrast, the computer world is full of heterogeneity; users are often equipped with a variety of computers even within a single organisation. For example, members of an engineering department may use UNIX based workstations, members of the marketing department may use Apple MacIntosh computers, and members of the finance and other departments may use IBM PC workstations, running the OS/2 operating system. For each different environment (UNIX, Apple, OS/2), a different front-end into the voice messaging system will need to be developed and supported. This is both time-consuming and costly. Furthermore, if the front ends differ between environments, users who change departments and thereby move from one environment to another, will need to be re-educated in the new environment. This again represents an additional and undesirable expense.

Another significant problem is that remote access to the voice mail system may be much more difficult via a computer network than through the telephone network. Thus maybe a user cannot or does not know how to navigate from a remote workstation through the computer network to the voice mail system, or to the computer which provides access to it. Furthermore, the remote workstation may not offer or support the GUI front end into the voice mail system which the user needs in order to effectively access any voice mail messages.

Accordingly, the invention provides a voice mail system, including:
  means for storing voice mail messages for at least one user;
  a server system, accessible via the Internet World Wide Web (WWW) from a WWW client terminal, and responsive to a request received from said WWW client terminal, for retrieving information relating to the stored voice mail messages, and for returning said information to the WWW client terminal.

The invention exploits the fact that a World Wide Web (WWW) front end is already available for all commercially significant platforms, being provided for general access to the WWW. Therefore, there is no need to develop or maintain separate front ends into the voice mail system, but rather generally available client software can be used. It is very likely that in future years WWW client software will be pre-loaded into almost all new computer workstations, so that access via the WWW will eventually be available from the vast majority of computers across the world. Furthermore, users are already familiar with the WWW, so that very little additional training is required.

It will also be appreciated that the Internet provides all the networking required to support the WWW, effectively transparently to the user. Thus a remote user, providing that they can remember a single address within the Internet (effectively equivalent to a phone number) can obtain access to voice mail through the WWW quickly and easily, without requiring any knowledge of the network structure that is supporting this connection (eg which gateways to use, and so on). It will further be recognised that exploiting the Internet infrastructure is a very cost-effective way of communicating between sites.

In a preferred embodiment, the voice mail system further includes directory means for maintaining information about the stored voice mail messages, the server system interacting with said directory means to obtain said information concerning the stored voice mail messages. Each user has a mailbox for storing his or her voice mail messages, and said request received over said WWW identifies a particular mailbox, with the information retrieved and returned to the WWW client terminal relating to the voice mail messages in that mailbox. The information retrieved and returned to the WWW client terminal relating to the voice mail messages in a particular mailbox includes information on the date and time of receipt of each message in the mail box. Said server system is further responsive to a request received over said WWW identifying a particular stored message, to retrieve audio data corresponding to said particular stored message, and to return said audio data to the WWW client terminal.

It is also preferred that the server system includes an application program which is launched in response to receiving said request from said WWW client terminal, said application program means communicating with the means for storing voice mail messages in order to retrieve a voice message.

Preferably the server system further includes: means for obtaining a password from the user; means for transmitting the password for verification to the means for storing voice mail messages before providing the user with information about the stored voice messages; and means for writing the password back to the user in concealed form with said information about the stored voice messages, wherein the password in concealed form is automatically included in further requests from the user to enable password verification of said further requests, without the user explicitly having to re-enter the password. Password control is widely used to prevent unauthorised access to voice mail messages. However, once a user has entered a password which has been duly verified, it is undesirable to compel the user to re-enter the password for each additional request, for example, if a particular message is selected for listening. This can be avoided by writing the verified password back to the WWW client, so that it can be picked up again for future requests. For security reasons, the password should be written out in concealed form (eg in encrypted form, and not actually displayed at the WWW client).

The invention further provides a method for accessing messages stored in a voice mail system over the Internet World Wide Web, said method including the steps of: receiving a request from a WWW client terminal to access said stored messages; retrieving information relating to the stored voice mail messages; and returning said information to the WWW client terminal.

An embodiment of the invention will now be described in detail, with reference to the following drawings.

Figure 1:
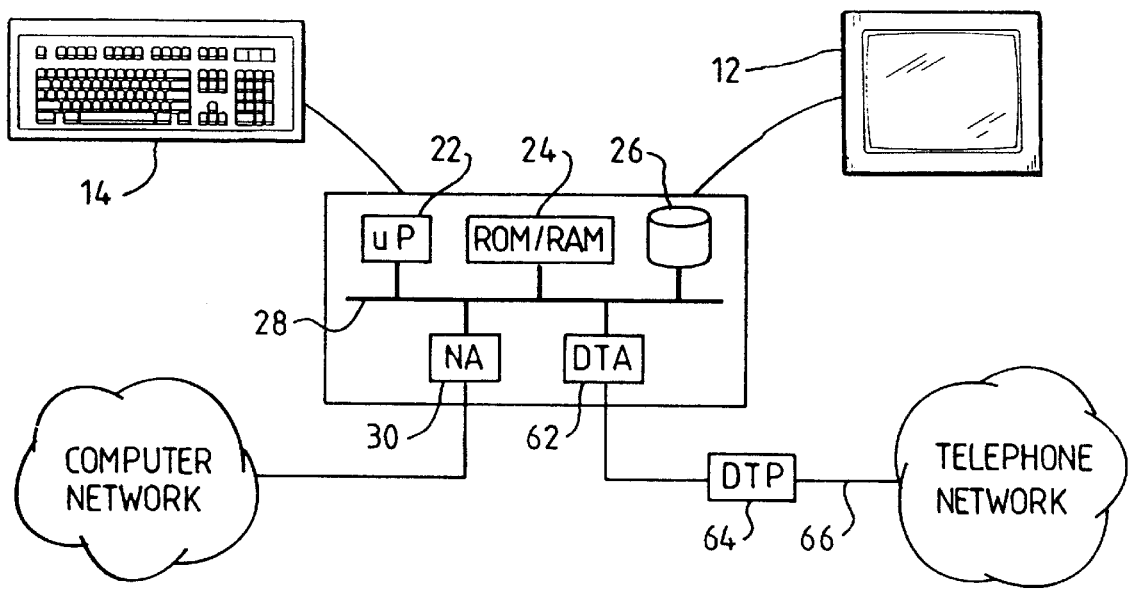
FIG. 1 is a simplified diagram of a voice mail system.

FIG. 1 is a simplified diagram of a voice mail system based on a conventional computer workstation comprising system unit 20, display screen 12, and keyboard 14. The system unit includes a microprocessor 22, ROM/RAM 24, and disk storage 26, connected together via bus 28. In order to operate as a voice mail unit, the computer workstation is connected to telephone line 66 via a digital trunk processor 64 and a digital trunk adapter card 62. The voice mail system also includes a network adapter card 30 to connect the voice mail system to a computer network (eg a LAN). The voice mail system may also include other known components, such as an audio capture/playback card, a CD-ROM and mouse (not shown).

The voice mail system illustrated in FIG. 1 is based on the DirectTalk/6000 voice processing system, available from IBM Corporation. The hardware components of this system are an RISC System/6000 computer workstation, plus the digital trunk processor and digital trunk adapter. The DirectTalk/6000 system connects to the telephone network through a T1 or E1 digital trunk line 66 (and via a PBX in most installations). The digital trunk processor is used to demultiplex incoming signals and multiplex outgoing signals on the trunk line, and perform log-linear conversion as appropriate. The digital trunk processor is also used to perform compression/decompression. The digital trunk adapter effectively acts as an interface between the workstation itself and the digital trunk processor. Further details about the DirectTalk/6000 voice processing system can be found in the manual "IBM Callpath DirectTalk/6000, General Information and Planning" (publication number GC22-0100-04) and the other manuals referenced therein.

Figure 2:
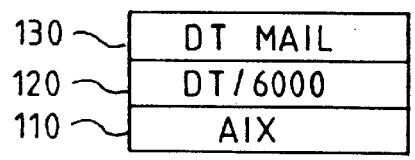
FIG. 2 is a simplified diagram of the main software components of the voice mail system of FIG. 1.

FIG. 2 is a simple block diagram of the main software components running on the voice mail system of FIG. 1. Running on the RISC System/6000 is first of all the operating system for the workstation, which in the present case is AIX 110, and then the DirectTalk/6000 software 120 itself. Also on the RISC System/6000 workstation, effectively running as an application on top of DirectTalk/6000, is DirectTalkMail 130, which provides standard voice messaging capabilities.

It will be appreciated that voice mail systems such as that illustrated in FIGS. 1 and 2 are well-known, and that many variations on the system illustrated are also well-known. For example, there are many systems in which telephone line 66 is analog, in which case the digital trunk processor is often omitted, and its functions performed, where appropriate by a suitable telephony adapter card. The precise hardware configuration employed in the voice mail system is not relevant to an understanding of the present invention, and so will not be discussed further.

The DirectTalkMail voice messaging system itself can be considered as a form of database system, based on mailboxes. Thus each user has a mailbox, which has associated with it all the information for that user, eg their extension number, their password, the number of new messages that they have, their current greeting, and so on. The mailbox also logically contains the digitised stored messages for that user (although physically the audio recording may be stored in a different location from the other information). Each mailbox has a unique identifier, such as a number or name, for example, each mailbox can be allocated the extension number of the user associated with that mailbox. The DirectTalkMail voice messaging system also contains routines to allow callers to telephone messages into the database and users to extract messages from the database for listening over the telephone, as well as other functions such as forwarding messages. The operation of a voice mail system in such a manner is well-known and so will not be described further.

Figure 3:
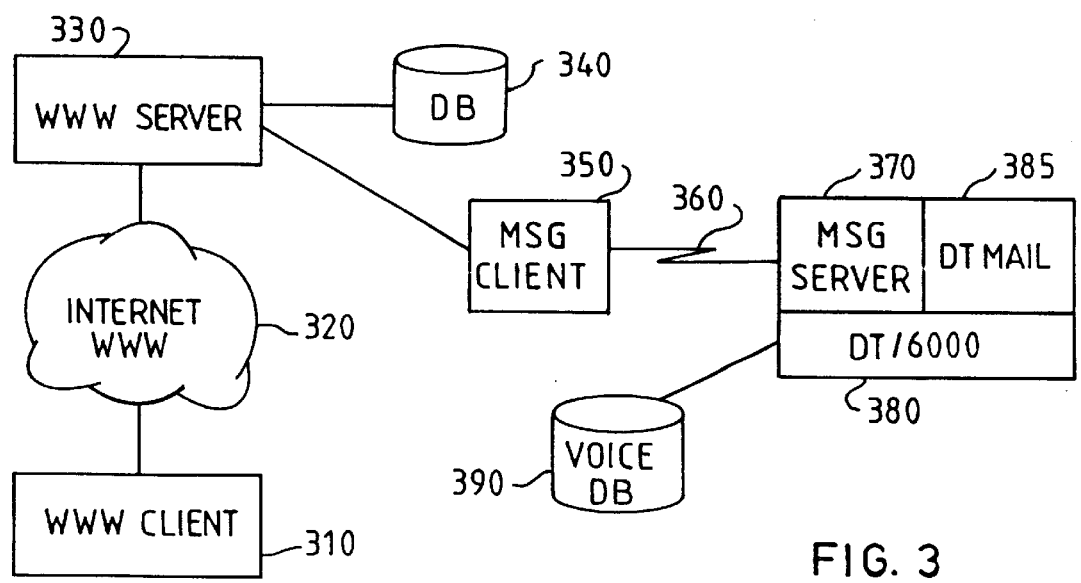
FIG. 3 is a schematic diagram of a system to provide access to voice mail over the Internet World Wide Web (WWW) in accordance with the invention.

FIG. 3 illustrates schematically the architecture whereby access can be provided to voice mail messages in a voice mail system over the Internet World wide Web (WWW). More specifically, a user at a WWW client 310, can obtain access to their voice mail through the Internet WWW communication network 320 and a WWW server 330. The server in turn is attached to a message client 350, which communicates with a message server 370. This latter component is an application on a DirectTalk/6000 voice processing system which is used to access voice message information, including the voice messages themselves, and direct this back towards the requesting WWW Client.

Reviewing now the structure of the WWW, this is based on Universal Resource Locators (URLs), which can be regarded as specifying a particular page or file on the WWW. The URL denotes both the server machine, and the particular file or page on that machine. There may be many pages or URLs resident on a single server. If a user at a WWW client 310 selects a URL on WWW server 330, then the server performs an action specific to that page. In some cases this can lead to the server launching an application, but in the majority of cases the server retrieves the requested page from a database 340 of stored pages, and this is transmitted back over the WWW 320 to the WWW client for display to the user. The pages are formatted in accordance with a standard format known as HTML. Many pages include images which are stored in separate graphics files at the server, for example in standard ".gif" or ".jpeg" format. The HTML text contains references to these graphics files, which prompt the client to also retrieve the specified files from the server, thereby allowing the client to display both the HTML text and associated images. Other pages available on the WWW include video or audio excerpts, for example from studios advertising their latest films or compact disk recordings.

The WWW client 310 provides the user with a simple GUI, allowing the user to navigate over the WWW network 320 to different URLs. Sometimes a user will specify a particular URL by name, but more often a user will jump from one URL to another by means of references within a page (a so-called "hyperlink"). Thus a particular word or symbol on a page can be associated with another URL, so that selection of that word or symbol, eg by clicking a mouse at the relevant location, causes the client to retrieve and display the page from the selected URL. This new page may be located on a completely different server from the first page. Words or symbols which map to another URL are sometimes referred to as "hot button" (or similar). There may be many hot buttons or hyperlinks in a single page.

There are a variety of web clients 310 commercially available, for example Web Explorer from IBM Corporation, and Mosaic from NCSA. All such clients understand HTML and other WWW standard formats and can display or output correctly files in these formats. Similarly, the mechanisms for navigating between different URLs are also understood and implemented by such programs. Further information about the World Wide Web can be found in "Spinning the Web" by Andrew Ford (International Thomson Publishing, London 1995) and "The World wide Web Unleashed" by John December and Neil Randall (SAMS Publishing, Indianapolis 1994).

Figure 4:
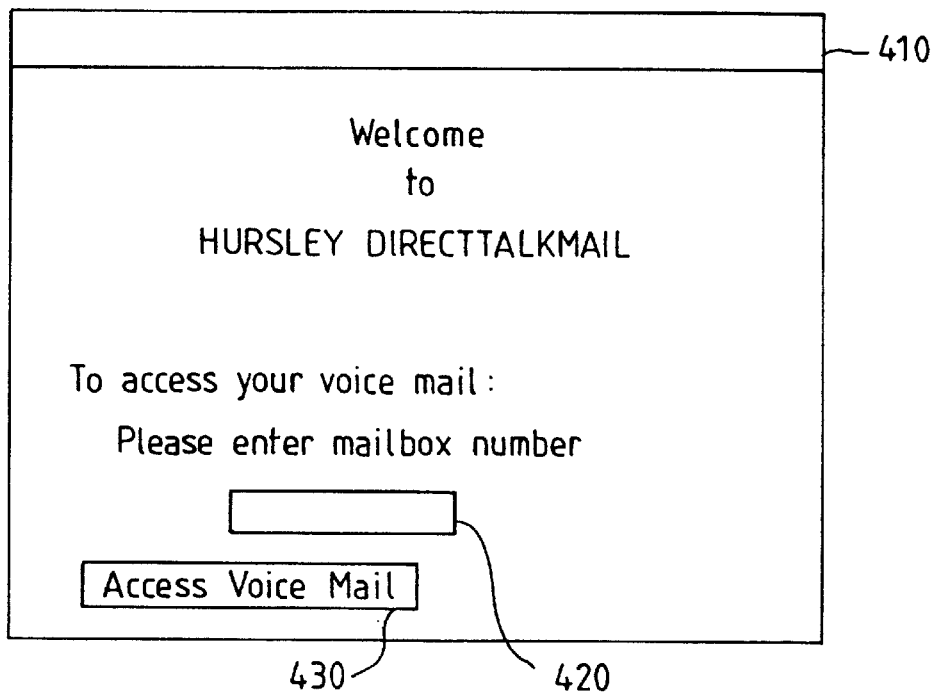
FIG. 4 is an illustration of a WWW screen providing access to a voice mail system.

In order to access their voice mail over the WWW, a user needs to know firstly the URL corresponding to the voice mail system, and secondly their own mailbox number. Note that these will be the same irrespective of the location of a user (unlike a telephone number, where local/district codes may be dropped, and international access codes may vary). When the user enters the URL of the voice mail system, this results in a request being passed to the server 330. The server then retrieves a corresponding HTML file from the database 340, which produces a screen display as shown in FIG. 4. At the top of this screen is a control bar 410, which is provided in known fashion by the WWW Client to allow the user to control their interaction with the WWW. For example, buttons on the control bar may be used to return to a previously accessed URL, to abort access to the currently requested URL, to display the location of the current URL, and so on. In terms of the information actually supplied by the WWW Server, apart from a general welcome, there are two main features of interest. The first is a box 420 into which a user is prompted to enter their mailbox number. Data entry in this manner is well-known in WWW operations. Secondly, there is a hot button or hyperlink 430, which the user selects to obtain remote access to their voice mail.

In standard fashion, if the hyperlink 430 is activated, the WWW client 310 transmits a message to this effect back to WWW server 330. This message also includes the mailbox number entered by the user. In the present embodiment the WWW server 330 is the host for both the page shown in FIG. 4, and for the hyperlink 430, although this does not have to be the case. The WWW server, as resident target for the hyperlink 430, maintains information which indicates that it corresponds to an application, rather than to a simple page of information from database 340 (such as was displayed in FIG. 4). Thus in response to activation of the hyperlink, the WWW server identifies and launches the application corresponding to the hyperlink URL. This application is shown in FIG. 3 as MSG Client 350. Note that in the present embodiment, MSG Client is situated on the same machine as the WWW Server.

The MSG Client 350, when activated, initiates communications with another application, MSG Server 370, which as shown in FIG. 3 effectively runs on top of the DirectTalk/6000 voice processing system 380, in parallel with the voice messaging software 385. In order to start such communications, MSG Client knows the network address and predetermined port number for MSG Server 370, allowing a standard UNIX socket to be set up between the two. This allows the MSG Client and MSG Server to communicate in known fashion. The WWW server passes to the MSG Client application certain start-up parameters, in particular the selected mailbox number, and also a control parameter referred to as a message type, which is set to zero. The basic mode of operation for the MSG Client and MSG Server is that the latter sends messages to the former which contain this message type and a data structure. The message type indicates the form of the request: in the present embodiment, a message type of "0" requests information about all messages within a specified mailbox, whilst a message type of "1" requests the actual audio data for a specified message. As previously stated, when the MSG Client is initiated, the WWW Server passes it a message type of 0, indicating that the MSG Client should commence with a request to list all the messages in the specified mailbox (ie the mailbox entered into the screen shown in FIG. 4). For a message type of 0, the data structure included in the request effectively only needs to contain the identity of the mailbox to be accessed.

It is generally convenient for the MSG Client and MSG Server to be situated at the same location. This allows the link 360 between the two to be a relatively short and simple connection, permitting high bandwidth communications, and it is generally easier from a practical point of view to maintain compatibility between the MSG Client and MSG Server if they are reasonably near to one another. However, in other circumstances they may be at separate locations, and there may be multiple WWW Servers and MSG Clients served by a single MSG Server.

On receipt of a message type of 0, the MSG Server 370 retrieves information relating to the messages belonging to the voice mailbox specified in the request. In order to do this, the MSG Server application is provided with the same knowledge of the structure of the voice mail database 390 as the DirectTalkMail voice messaging application 385 itself. This knowledge allows the MSG server to interrogate and access the voice mail database in the same manner as the DirectTalkMail program. Since the DirectTalkMail program is itself an application on top of the DirectTalk/6000 voice processing system, exploiting the custom server interface of the DirectTalk/6000 system in order to manage mailboxes and voice messages, it is straightforward for MSG Server to also manage voice mail using the same interface. Indeed, one possibility would be for the MSG Server to be incorporated within the DirectTalkMail program.

The information retrieved by MSG Client is then returned in a data structure back to the MSG Client. Such data communications are again performed using standard UNIX facilities for passing data between sockets. The data structure contains some general information about the mailbox (eg the number of outstanding messages, currently selected voice mail greeting etc), plus a list of messages in the specified mailbox, with information specific to each message (eg date and time received, origin of message etc).

The MSG Client then formats the retrieved information into another HTML page, which presents the voice mail contents for the specified mailbox. This formatted page is then returned to the WWW Server, and from there across the WWW to the WWW Client for display. Note that as far as MSG Client is concerned, it simply writes the HTML page to the standard output; the WWW Server (which of course initiated MSG Client) is then responsible for taking the output from there and transmitting it to the WWW Client, in accordance with standard WWW server operation.

Figure 5:
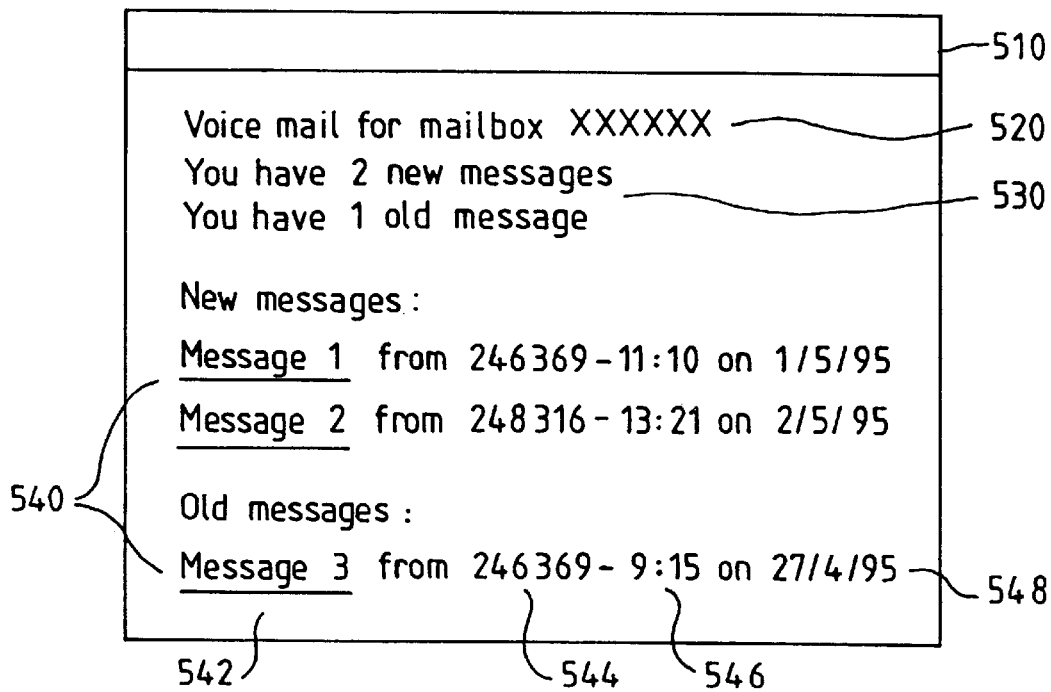
FIG. 5 is an illustration of a WWW screen providing access to the messages in a particular mailbox.

FIG. 5 is an illustration of such a page, listing the current mail messages in the mailbox. The screen of FIG. 5 includes the WWW Client control bar 510, as previously discussed in relation to FIG. 4, plus information particular to this URL. Thus a header 520 indicates the relevant mailbox number (shown schematically in FIG. 5 as "XXXXXX"). Next is general information 530 about the mailbox, in the present embodiment the number of new and old messages. Other information that might be displayed here would be current greeting, and time of last access to the mailbox. Then each message 540 in the mailbox is listed with its number 542, date 548 and time 546 of receipt, and extension number of caller 544 (if available). One possibility would be for either MSG Client or MSG Server to perform a database lookup on the extension number in order to replace the number with the name of the person associated with that extension (who presumably made the call).

It will be understood that FIG. 5 is effectively the page of data corresponding to hyperlink 430. In principle it would be possible to request the URL corresponding to FIG. 5 directly, rather than via Hyperlink 430, using standard WWW navigation facilites. However, using this route (ie by-passing the stage shown in FIG. 4) would mean that no mailbox number had been entered, and accordingly the attempt to go directly to the URL corresponding to FIG. 5 would fail.

It will be noted that in FIG. 5 each message number 542 has been underlined. In the actual embodiment, these are a different colour from the rest of the text (rather than being underlined), indicating that they also represent hyperlinks. As would be expected, each hyperlink corresponds to the message identified by that particular line, and associated with each hyperlink is a URL as specified in the HTML page output by the MSG Client.

Thus in order to access a particular message, the user selects the corresponding hyperlink 542. This results in a request for that URL to be transmitted over the WWW to the WWW Server, which again detects that the URL corresponds to the MSG Client application program. This time however, when the WWW Server invokes the MSG Client, it specifies not only the mailbox number, but also the identifier of the requested message within that mailbox. Furthermore, the request type of the message is now "1", which indicates to the MSG Server that an actual voice mail message is desired.

It will be appreciated that each time the WWW Server invokes the MSG Client, a new copy of the MSG Client application is launched, rather than using the same copy for any particular user. This is why the WWW Server must specify the message type, since otherwise MSG Client does not know how far the interaction with the caller has progressed. Similarly, the newly invoked version of the MSG Client must be informed of the mailbox to be accessed. This can be done by extracting the mailbox number from the screen of FIG. 5, which was written there by the previous instance of MSG Client responsible for outputting the screen of FIG. 5, and returning this number to the newly created version of MSG Client. Of course, the mailbox number can be included in the URL page corresponding to FIG. 5, even if it is not specifically displayed on the screen. The user should not be able to change this mailbox number, otherwise he or she could obtain unauthorised access to other people's voice mail messages. Although the screen of FIG. 5 does not explicitly permit the mailbox number to be changed, expert WWW users may be able to achieve this effect, so that it is desirable to further improve security by the use of passwords, as described below.

The operation of the MSG Client for this new invocation is analogous to that for message type "0", in that it transmits a message to the MSG Server, this time with a message type of "1". The data structure included in this message not only identifies the mailbox, but also the desired message within that mailbox, determined of course by the particular hyperlink selected by the user. The MSG Server uses the mailbox number, and message number within the mailbox, in order to retrieve the actual audio data for the desired mail message. The audio data is then transmitted in digital form back to the MSG Client, again using standard UNIX communication facilities. The MSG Client then formats the message in accordance with standard WWW audio formats, before returning it to the WWW Server, for forwarding and playout at the WWW Client. Two standard WWW audio formats are a ".au" file, used for example in the IBM Ultimedia card, and a ".wav", used for example by SoundBlaster cards. The difference between these formats is primarily to do with the header information, rather than the actual storage of the audio data itself. A switch can be provided (for example in the screen of FIG. 5) to allow the user to select their desired choice of audio output file (in much the same way that many WWW sites currently provide a switch between different language output options).

It will be noted that the voice messages stored in the DirectTalkMail system are actually in compressed form to reduce storage requirements. When retrieved for playout the messages are decompressed in the present embodiment by the MSG Server. It would also be possible to perform the decompression at the MSG Client, which would reduce bandwidth requirements over link 360, which may be valuable depending on the nature of link 360. Of course, it would be even more efficient if the voice mail message could be compressed when transmitted over the WWW itself, where bandwidth certainly is constrained, but current WWW Clients are unable to perform the necessary decompression.

Figure 6:
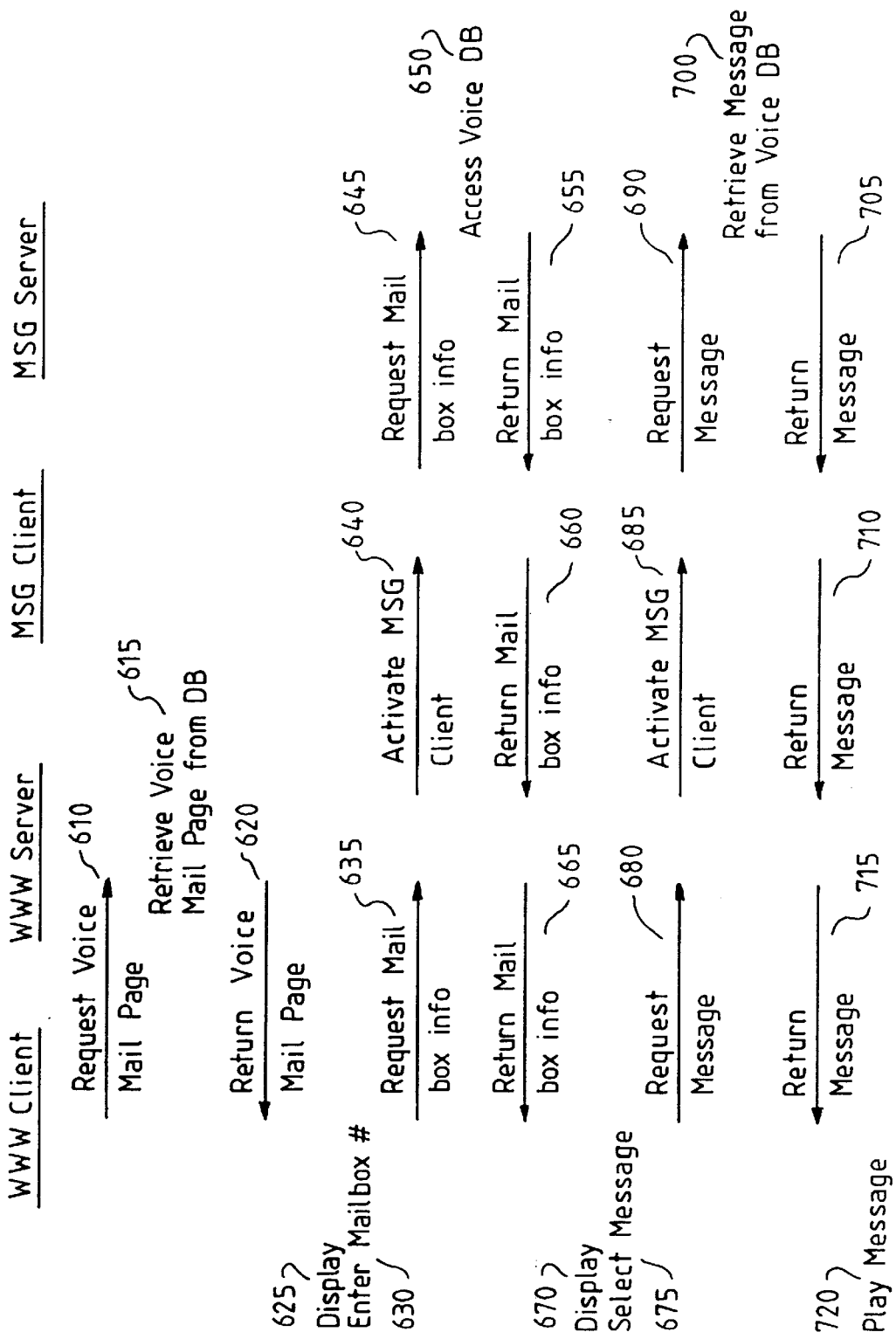
FIG. 6 is a flowchart of the method used to provide access over the WWW to a voice mail system.

FIG. 6 summarises the above processing which is initiated when a WWW Client requests 610 a URL corresponding to the screen of FIG. 4. The WWW Server retrieves 615 the requested URL page, which is then returned 620 to the WWW client for display 625. The user can now enter 630 their mailbox number into the screen of FIG. 4, and activate the hyperlink to request 635 information for this mailbox. The WWW Server responds to this request by activating 640 the MSG Client, which transmits 645 a request for the information to the MSG Server. The MSG Server accesses 650 the database of the voice mail system to obtain the requested information, which is then returned 655 to the MSG Client. The MSG Client then outputs 660 this information, which is picked up by the WWW Server and forwarded 665 to the WWW Client for display 670. The user now selects 675 a particular message from the displayed list of messages by activating a hyperlink. This causes a request to be sent 680 to the WWW Server, which in response launches 685 the MSG Client. The MSG Client transmits 690 the request to the MSG Server, which retrieves 700 the audio data for the requested message from the voice mail database. The message audio data is then returned 705 to the MSG Client, which outputs 710 it to the WWW Server, which in turn passes 715 the audio data to the WWW Client. The WWW client then uses the received audio data to play 720 the selected message to the user.

Although the ability to listen to voice mail messages at the WWW client does require suitable audio hardware (unless some voice recognition facility is used), multimedia machines are becoming much more common and such audio hardware may soon become standard on most personal computer workstations. It will be noted that the software to manage the audio output is already present in conventional WWW Clients, and so does not need to be specially developed, installed or maintained.

A useful enhancement which has been added to the embodiment described above is to provide password protection for access to voice mail messages over the WWW. The majority of voice mail systems do provide password protection for each mailbox for conventional telephone access. To support the same degree of protection for WWW access, a password entry box is added to the screen of FIG. 4 into which a password can be entered (actual display of the password on the screen is inhibited using standard techniques). The password is then transmitted by MSG Client back to MSG Server, together with the mailbox number, for verification. If the password is correct, the MSG Server returns the information for the screen of FIG. 4, otherwise it returns an error message which is forwarded onto the WWW Client. It will be appreciated that as with the mailbox number, it is desirable to avoid the user having to enter the password for each transaction in a session (ie having entered the password into the screen of FIG. 4, the user should not need to have to re-enter the password again for the screen of FIG. 5). AS with the mailbox number, the password can therefore be effectively included with the HTML output for the screen of FIG. 5, although for security reasons the password is encrypted or scrambled and included as a hidden field, as is known in the art, so that it is not actually displayed at WWW Client. When one of the hyperlinks shown in FIG. 5 is selected, the password is then returned to the next instantation of the MSG Client, decrypted, and included in the data structure transmitted to the MSG server for fresh verification.

Although the present embodiment only supports actually listening to a selected message from the screen of FIG. 5, it is straightforward to extend this scheme to cover other message operations, for example deleting the message, forwarding it to another mailbox, or saving it (ie transferring it from the "new" to "saved" list). To provide such options, the message number might no longer be a hyperlink, but rather each message line would have appended multiple hyperlinks, for example one for "listen", one for "delete", and one for "save". Each of these three actions would have a different message type; thus "delete" might be message type 2, and "Save" message type 3, with "listen" of course being message type 1 as above. On receipt of message type 2 or 3, MSG Server would then perform the requested operation to the message within the voice mail database. Following this, MSG Server would return to MSG Client an updated version of the screen of FIG. 5, with the selected message saved or deleted as appropriate.

What is claimed is:

1. A method for accessing messages stored in a voice mail system over the Internet World Wide Web, said method including the steps of:

receiving at a WWW server a request specifying a URL, said WWW server being separate from said voice mail system but having a link thereto over a communications network, said client request being sent to the WWW server from a WWW client terminal;

analysing the URL included in said client request to determine if said URL corresponds to a message client application, and if so, launching said message client application;

passing at least one parameter derived from said URL to the message client application;

transmitting a network request over said communications network by the message client application to a message server program running on said voice mail system;

responsive to said network request retrieving information stored in the voice mail system by the message server program, said information being dependent upon said at least one parameter and relating to the stored voice mail messages;

returning said information from the message server program to the message client application;

formatting the information by the message client application for presentation by a WWW browser;

and returning said formatted information to the WWW client terminal from the WWW server.

2. The method of claim 1, further including the steps of:

maintaining information about the stored voice mail messages in a directory;

and interacting with said directory means to obtain said information concerning the stored voice mail messages.

3. The method of claim 1, wherein each user has a mailbox for storing his or her voice mail messages, and wherein said request received over said WWW identifies a particular mailbox, and the information retrieved and returned to the WWW client terminal relates to the voice mail messages in that mailbox.

4. The method of claim 3, wherein the information retrieved and returned to the WWW client terminal relating to the voice mail messages in a particular mailbox includes information on the date and time of receipt of each message in the mail box.

5. The method of claim 1, further including, responsive to a request received over said WWW identifying a particular stored message, the steps of:

retrieving audio data corresponding to said particular stored message;

and returning said audio data to the WWW client terminal.

6. The method of claim 1, further including the steps of:

obtaining a password from the user;

verifying the password before providing the user with information about the stored voice messages; and writing the password back to the user in concealed form with said information about the stored voice messages, wherein the password in concealed form is automatically included in further requests from the user to enable password verification of said further requests, without the user explicitly having to re-enter the password.

7. An Internet voice mail system for providing access to stored messages over the World Wide Web (WWW), said system including:

a WWW server for receiving a request from a WWW client terminal to access said stored messages, said request specifying a URL;

a storage system for storing voice mail messages and connected to the WWW server via a communications link;

program means running on the WWW server responsive to the particular URL specified in said request for launching a message client program, said message client program acting to forward said request to the storage system and to format and forward a response from the storage system back to the WWW client terminal;

a message server program running on said storage system for receiving said request, for retrieving information at the storage system relating to the stored voice mail messages, said information being dependent on said URL, and for returning a response including said information to the message client program;

wherein the retrieved information is returned to the WWW client terminal via said message server, said message client, and the WWW server.

8. An Internet voice mail system for providing access to stored messages over the World Wide Web (WWW), said system including:

a plurality of WWW servers for receiving requests from WWW client terminals to access said stored messages, each request specifying a URL;

a storage system for storing voice mail messages and connected to the WWW servers;

program means running on each WWW server responsive to the particular URL specified in a request for launching a message client program, said message client program acting to forward the request to the storage system and to format and forward a response from the storage system back to the WWW client terminal;

a message server program running on said storage system for receiving said requests, for retrieving information at the storage system relating to the stored voice mail messages, said information being dependent on said URL, and for returning a response including said information to the message client program;

wherein the retrieved information is returned to the WWW client terminal via said message server and the relevant message client and WWW server.

* * * * *